United States Patent
Rueda et al.

(10) Patent No.: US 6,597,660 B1
(45) Date of Patent: Jul. 22, 2003

(54) METHOD FOR REAL-TIME TRAFFIC ANALYSIS ON PACKET NETWORKS

(75) Inventors: Jose A. Rueda, Manitoba (CA); Yair Bourlas, Manitoba (CA); Jeffrey E. Diamond, Manitoba (CA); Robert D. McLeod, Manitoba (CA)

(73) Assignee: Telecommunications Research Laboratory, Edmonton (CA)

( * ) Notice: Subject to any disclaimer, the term of this patent is extended or adjusted under 35 U.S.C. 154(b) by 0 days.

(21) Appl. No.: 09/341,015

(22) PCT Filed: Dec. 31, 1997

(86) PCT No.: PCT/CA97/00991

§ 371 (c)(1),
(2), (4) Date: Jul. 1, 1999

(87) PCT Pub. No.: WO98/30059

PCT Pub. Date: Jul. 9, 1998

Related U.S. Application Data

(60) Provisional application No. 60/034,607, filed on Jan. 3, 1997.

(51) Int. Cl.[7] .................................................. H04J 1/16
(52) U.S. Cl. ..................................... 370/230.1; 370/236
(58) Field of Search ................................. 370/230, 235, 370/232, 233, 234, 236, 236.1, 236.2, 241.1, 252, 253, 230.1

(56) References Cited

U.S. PATENT DOCUMENTS

| | | | | |
|---|---|---|---|---|
| 5,357,507 A | * | 10/1994 | Hughes et al. | 370/234 |
| 5,357,510 A | * | 10/1994 | Norizuki et al. | 370/236 |
| 5,946,297 A | * | 8/1999 | Calvignac et al. | 370/230 |

* cited by examiner

Primary Examiner—Wellington Chin
Assistant Examiner—William Schultz
(74) Attorney, Agent, or Firm—Adrian D. Battison; Michael R. Williams; Ryan W. Dupuis

(57) ABSTRACT

An architecture for capture and generation, and a set of methods for characterization, prediction, and classification of traffic in packet networks are disclosed. The architecture consists of a device that stores packet timing information and processes the data so that characterization, prediction, and classification algorithms can perform operations in real-time. A methodology is disclosed for real-time traffic analysis, characterization, prediction, and classification in packet networks. The methodology is based on the simultaneous aggregation of packet arrival times at different times scales. The traffic is represented at the synchronous carrier level by the arrival or non-arrival of a packet. The invention does not require knowledge about the information source, nor needs to decode the information contents of the packets. Only the arrival timing information is required. The invention provides a characterization of the traffic on packet networks suitable for a real-time implementation. The methodology can be applied in real-time traffic classification by training a neural network from calculated second order statistics of the traffic of several known sources. Performance descriptors for the network can also be obtained by calculating the deviation of the traffic distribution from calculated models. Traffic prediction can also be done by training a neural network from a vector of the results of a given processing against a vector of results of the subsequent processing unit; noticing that the latter vector contains information at a larger time scale than the previous. The invention also provides a method of estimating an effective bandwidth measure in real time which can be used for connection admission control and dynamic routing in packet networks. The invention provides appropriate traffic descriptors that can be applied in more efficient traffic control on packet networks.

21 Claims, 11 Drawing Sheets

Input to H-meter from ATM Capture Cell Timestamps

■ Non-idle cell
□ Idle cell

METHOD FOR REAL-TIME TRAFFIC ANALYSIS ON PACKET NETWORKS

This application claims priority under 35 U.S.C.119 from Provisional Application Ser. No. 60/034,607 filed Jan. 3, 1997.

THE FIELD OF THE INVENTION

This invention relates in general to traffic analysis on packet networks. Packet networks are telecommunication networks in which the information is transmitted in small binary groups called packets. An advantage of packet networks is that it can handle different sources simultaneously by processing the packets sequentially. The packets travel through the network via a fast synchronous carrier; this can be viewed as a train of pulses which transport the packets. The speed of this carrier determines the maximum speed of the packet network. These networks can process only one packet at a time and thus the order in which the packets are processed depends on the priorities and quality of service required by the sources. Packets from a given source are mixed with packets from other sources. Each packet has a header that identifies its destination. Once the packets arrive at their destination, the headers are removed and the information is reassembled. Since these networks generally carry traffic from different types of sources which demand different service levels from the network, it is important from a network operation and management point of view to know the characteristics of the expected traffic. In the standards for packet networks that use the asynchronous transfer mode protocol (ATM), the traffic is described by first order statistics such as the peak cell rate, cell delay variation tolerance, sustainable cell rate, and maximum burst size. The size of the packets in ATM networks (that is networks which utilize the ATM protocol) is 53 bytes, of which 5 bytes compose the header and the remaining 48 bytes contain a section of the information being transmitted. The rate is defined as the number of packets that flow through the network in a given unit of time; this is a measure of the speed of the telecommunications network. The peak cell rate is defined as the inverse of the minimum time between successive packet arrivals to a switch. The cell delay variation tolerance is defined as the sensitivity of the information to changes in delay of the packets as they flow through the network. The sustainable cell rate is defined as the maximum average rate. The maximum burst size is defined as the maximum number of cells at the peak rate. Two of these parameters, the peak cell rate and the sustainable cell rate, have been defined as mandatory traffic parameters (or descriptors) in the ATM Forum UNI version 3.0 standards, as explained by McDysan and Spohn [11].

There are two types of networks which differ according to the way a connection is handled. The first type is connection-oriented. In these networks it is required to set up several parameters before any data transmission can take place. This is a process in which a source negotiates a level of service with the network. An end-to-end path with a quality of service is established and all the packets from the source will follow this path. The second type is connectionless in which it is not required to set up an end-to-end connection. The network handles the packets individually.

Quality of service (QoS) is a parameter meaningful from a source to a destination point of view, as well as at each link in the network. In connection-oriented networks, the negotiation for a QoS is carried out by agreeing on certain parameters. These parameters are based on first order statistical measures of the performance, such as the average delay, cell delay variation, error rates, and different levels of packet loss, as explained in the Bellcore requirements for broadband switching systems [2].

Packet networks have been designed to carry traffic from multimedia sources, among them different types of video and audio, voice, and data communications. Each traffic source presents the network with different requirements. The network must be able to handle all these traffic sources at their respective quality of service. The problem that arises is how to accurately characterize the different traffic sources for efficient network utilization. It might, in fact, be required to measure quality in different ways for different traffic sources. This makes the performance measurement problem very complex.

In our invention, a method is used to characterize the traffic in real-time. The method is used to calculate traffic descriptors considering properties of the traffic which have not been considered previously in commercial equipment. The descriptors are based on properties of the traffic that have been reported in the literature, but the techniques available are not suitable for real-time measurements. The algorithm presented is based on the simultaneous measurement of the traffic at different time scales. The data is represented in an appropriate form, processed and organized in an array of vectors. From this array, higher order statistical measures are derived. The traffic descriptors calculated in this way are used to characterize the traffic. The algorithm is implemented in real-time. The information is also used for traffic classification and performance prediction.

THE DESCRIPTION OF RELATED ART

The following references have been identified in a search in this field, some of which are relevant to the present invention:

Publications

[1] R. Addie, M. Zukerman, and T. Neame, "Fractal Traffic: Measurements, Modelling and Performance Evaluation", in Proc. IEEE Infocom, pp. 977–984, 1995.

[2] Bellcore, "Broadband Switching System Generic Requirements", GR-1110-CORE, Revision 3, April 1996.

[3] J. Beran, R. Sherman, M. Taqqu, and W. Willinger, "Long-Range Dependence In Variable-Bit-Rate Video Traffic", in IEEE Trans. on Communications, vol. 43, no. 4, pp. 1566–1579, April 1995.

[4] Y. Chen, Z. Deng, and C. Williamson, "A Model for Self-Similar Ethernet LAN Traffic: Design, Implementation, and Performance Implications", internal report, University of Saskatchewan, Canada, 1995.

[5] M. Devetsikiotis, I. Lambadaris, R. Kaye, "Traffic Modeling and Design Methodologies for Broadband Networks", *Canadian Journal on Electrical and Computer Engineering*, vol. 20, no. 3, 1995.

[6] M. Garrett and W. Willinger, "Analysis, Modeling and Generation of Self-Similar VBR Video Traffic", in Proc. ACM Sigcom, London, UK, pp. 269–280, 1994.

[7] R. Guerin, H. Ahmadi and M. Naghshineh, "Equivalent Capacity and its to Bandwidth Allocation in High Speed Networks", *IEEE JSAC*, vol. 9, no. 7, 1991.

[8] C. Huang, M. Devetsikiotis, I. Lambadaris, and A. Kaye, "Modeling and Simulation of Self-Similar Variable Bit Rate Compressed Video: A Unified Approach", in ACM Sigcom, Cambridge 1995.

[9] W. Lau, A. Erramilli, J. Wang, and W. Willinger, "Self-Similar Traffic Generation: The Random Midpoint Displacement Algorithm and its Properties", in Proc. IEEE Int Conf. Commun., 1995.
[10] W. Leland, M. Taqqu, W. Willinger, and D. Wilson, "On The Self-Similar Nature of Ethernet Traffic (extended version)", *IEEE/ACM Trans. Networking*, vol. 2, no. 1, pp. 1–15, February 1994.
[1] B. Mandelbrot, "Self-Similar Error Clusters in Communication Systems and the Concept of Conditional Stationarity", in IEEE Trans. on Communication Technology, pp. 71–90, 1965.
[12] D. McDysan and D. Spohn, "ATM Theory and Application". Toronto: McGraw-Hill, 1995.
[13] D. McLaren and D. Nguyen, "A Fractal-Based Source Model for ATM Packet Video", in Int. Conf. on Digital Processing of Signals in Communications, Univ. of Loughbovough, September 1991.
[14] V. Paxson, "Fast Approximation of Self-Similar Network Traffic", report LBL-36750, Univ. of California at Berkeley, Lawrence Berkeley Laboratory, 1995.
[15] A. Rueda and W. Kinsner, "A Survey of Traffic Characterization Techniques in Telecommunication Networks", *Proc. IEEE Canadian Conference on Electrical and Computer Engineering*, pp. 830–833, May 1996.

U.S. Patents

U.S. Pat. No. 5,050,161 Congestion management based on multiple framing strategy U.S. Pat. No. 5,274,625 Traffic measurements in packet communication networks U.S. Pat. No. 5,341,366 Connection admission control system U.S. Pat. No. 5,343,463 Performance measurement system for a telecommunication path and device used therein U.S. Pat. No. 5,343,465 Method and system for real-time burstiness analysis of network traffic U.S. Pat. No. 5,357,507 Fast connection admission control for ATM networks U.S. Pat. No. 5,357,510 Apparatus and method for supervising and controlling ATM traffic U.S. Pat. No. 5,365,514 Event driven interface for a system for monitoring and controlling a data communications network U.S. Pat. No. 5,375,070 Information collection architecture and method for a data communications network U.S. Pat. No. 5,394,394 Message header classifier U.S. Pat. No. 5,426,635 Method for adaptive control of windows and rates in networks U.S. Pat. No. 5,434,848 Traffic management in packet communication networks U.S. Pat. No. 5,448,567 Control architecture for ATM networks The traffic characterization techniques for telecommunication networks found in the literature can be classified into the following categories [5], [14]: autoregressive moving average (ARMA) models, Bernoulli process modeling, Markov chain modeling, neural network models, self-similar models, transform-expand-sample (TES) models, traffic flow models, and wavelet models.

Different kinds of stochastic (statistical) models reported in the literature have successfully been used in modeling traffic in telecommunication networks. For example, Markov chains are a useful tool in modeling communication systems. It is widely accepted that the short-term arrival processes in telecommunication networks can be accurately described by Poisson processes, for example an FTP control connection which can be modeled as a Markov modulated Poisson process (MMPP) [13].

Traffic on packet networks is irregular in nature as explained by Leland, et al. [9]. It is generally accepted that the long-range dependencies found in multimedia traffic can be described using models which consider self-similarity. Self-similarity is a measure of the variation of the traffic properties at different time scales. Several traffic models of this type have been reported [1], [4], [6], [7], [8], and [12].

The traffic descriptors that have been utilized in packet networks are based on statistical measures such as the mean, peak and sustained rates, burst length, and cell-loss ratios. These do not quantify correlation well, and thus a need exists for descriptors that provide more information in order to describe highly correlated and bursty (irregular) multimedia traffic [3] and [10].

Traditional analysis techniques cannot be successfully applied. The methods that have been proposed for the analysis of traffic in packet networks are impractical for a real-time implementation since they required calculations that involved several processing phases on a stored time series.

A method for time deviation (TDEV) calculation for synchronization monitoring in SONET/SDH networks is proposed by Grover and Stamatlakis [15]. Their method consists of the calculation of simultaneous averages of the second differences of time interval errors (TIE) at different time scales. A time scale is represented by blocks that contain a number of second differences which is a power of two. For each block the second differences are added and the result is squared. The sums of the squares are then divided by six and by a constant to obtain a measure called the time variance (TVAR) for the time scale. Each new TIE value produces a new second differences and this is used to updated all the block sums of all the time scales. Each new second difference could complete a block sum for one or more blocks and a new TVAR could be obtained. The results are used to produce a plot of the logarithm base two of the TVAR values of all the blocks versus the logarithm base two of the block size. Their paper also details the standard block calculation which consists of calculating the TVAR values for all the blocks in a batch mode (or block mode, or off-line). This consists of calculating the block sums and TVAR values of a time series of TIE values for each block separately.

[7] W. D. Grover and D. Stamatlakis, "Continuous TDEV calculation for in-situ synchronisation monitoring in SONET/SDH networks", *Electronic Letters*, vol. 29, No. 16, pp. 1405–1406, August 1993.

Namajunas and Tamasevicius [16] proposed a device for measuring fractal dimensions from a time series in real-time. Their device is an electronic circuit that produces an approximation to the fractal dimension of a class of analog electric signals in real-time.

[8] A. Namajunas and A. Tamasevicius, "A technique for measuring fractal dimensions from time series on a real-time scale", *Physica D*, vol. 58, pp. 482–488, 1992.

SUMMARY OF THE INVENTION

It is one object of the present invention to provide a method for characterizing transmissions in a packet network which may or may not be carried out in real time and may provide information which can be used to characterize the transmissions for prediction and access control.

According to a first aspect of the invention there is provided a method for deriving information related to characteristics of transmissions in a packet network comprising:

providing a packet network for carrying a plurality of transmissions from at least one source in which the transmissions from the or each source are divided into a plurality of sequential packets each packet having address data defining an intended address, information data defining information to be transmitted and id data defining a source identity;

the network defining a train of sequential packet transport locations into which packets are loaded for transmission, such that some packet transport locations in a train contain packets and some packet transport locations are empty and such that, when there is more than one different source, the train contains packets from the different sources in a sequential arrangement as determined by the network;

monitoring a train of packet transport locations to determine which packet transport locations are empty and which contain a packet;

generating a series of data elements each corresponding to a respective one of the packet transport locations and each identifying whether the respective packet transport location is empty or whether the respective packet transport location contains a packet;

and carrying out statistical analysis on the series of data elements to determine the characteristics of the transmissions.

Preferably the statistical analysis is carried out in real time so that predictions and characterization of the transmissions can be done in real time.

Preferably, as an alternative, the data elements are stored for example in the hard drive of a PC for subsequent analysis and the statistical analysis is carried out subsequent to completion of the transmissions when a series of transmissions have been recorded for analysis.

Preferably the statistical analysis is carried out at a plurality of different time scales in order to provide the calculations as set out hereinafter. Preferably the statistical analyses are carried out simultaneously by providing for each different time scale a respective one of a plurality of registers and entering information from the data elements into each register sequentially.

Preferably, in a simple single mode, the data elements comprise data bits defining "0" when the respective packet transport location is empty and "1" when the respective packet transport location contains a packet and wherein the information for each register is obtained by adding the contents of a next adjacent previous register.

Using the data bits, the analysis includes, for each register, calculating the sample variance of a set of successive observations of the register contents and from the variances estimating a value of the Hurst parameter H, which is the slope of a line which approximates the behavior of a plot of the logarithm of the variances of the registers versus the values of the sequential indices of the registers. This parameter is known per se but the present algorithm provides a technique for calculating this parameter in real time.

When the packets in the train are provided by a plurality of different sources the data elements are arranged to identify a packet transport location as containing a packet only when the packet is identified from the id data as provided by a selected one of the sources such that the characteristics determined relate to only the transmissions from the selected source.

When the packets in the train are provided by a plurality of different sources the data elements are arranged to identify a packet transport location as empty when no packet from any of the sources is contained and to identify when a packet transport location contains a packet from the id data as provided by each one of the sources which source provided the packet.

The characteristics determined from the data elements can be used to provide a calculation of an effective bandwidth of the transmissions for use in access control and prediction.

In particular the above method can be used in one example for determining whether a source additional to a plurality of existing sources of packet transmissions, each source having a predetermined peak rate of packet transmission, can be connected to a packet network, where a transmission medium of the network has a predetermined maximum allowable peak rate of transmissions. This is preferable effected by the steps of:

carrying out in real time the statistical analysis on the series of data elements to determine an effective bandwidth of the transmissions from the existing sources;

and calculating whether the additional source can be connected by comparing the effective bandwidth, the predetermined peak rate of packet transmission of the additional source and the predetermined maximum allowable peak rate of transmissions of the transmission medium of the network.

As an alternative, the method can be used for calculating whether a source additional to a plurality of existing sources of packet transmissions, each source having a predetermined peak rate of packet transmission, can be connected to a second packet network, a transmission medium of the second packet network having a predetermined maximum allowable peak rate of transmissions. This is effected by the steps of:

connecting the additional source to the packet network;

generating said series of data elements from transmissions from said additional source to said packet network;

carrying out in real time the statistical analysis on the series of data elements to determine an effective bandwidth of the transmissions from said additional source;

and calculating whether the additional source can be connected to the second packet network by using the effective bandwidth of the transmissions from said additional source.

According to a second aspect of the invention there is provided a method for deriving information related to the characteristics of transmissions in a packet network comprising:

providing a packet network for carrying a plurality of transmissions from at least one source in which the transmissions from the or each source are divided into a plurality of sequential packets each packet having address data defining an intended address, information data defining information to be transmitted and id data defining a source identity;

the network defining a train of sequential packet transport locations into which packets are loaded for transmission, such that some packet transport locations in a train contain packets and some packet transport locations are empty and such that, when there is more than one different source, the train contains packets from the different sources in a sequential arrangement as determined by the network;

monitoring a train of packet transport locations to determine which packet transport locations are empty and which contain a packet;

generating information defining which packet transport locations contain a packet and the empty locations therebetween;

and carrying out simultaneously and in real time a series of statistical analyses on the information at a plurality of different time scales to determine the characteristics of the transmissions.

In this aspect, the information is not necessarily the data bits as set forth above but can include other information relating to the population of the packets. However in this aspect, the analysis is effected in real time. Preferably however as explained in detail hereinafter, the information comprises a series of data elements each corresponding to a respective one of the packet transport locations and each identifying whether the respective packet transport location is empty or whether the respective packet transport location contains a packet and wherein the statistical analyses are carried out by providing for each different time scale a respective one of a plurality of registers and entering information from the data elements into each register sequentially.

More preferably the data elements comprise bits which define "0" when the respective packet transport location is empty and "1" when the respective packet transport location contains a packet and wherein the information for each register is obtained by adding the contents of a next adjacent previous register.

According to a third aspect of the present invention the same technique for generating bits relating to the empty and filled packets can be used in reverse in a method of generating packet transmissions for simulating a source having required transmission characteristics for transmitting on a packet network comprising:

providing a packet network for carrying a plurality of transmissions from at least one source in which the transmissions from the or each source are divided into a plurality of sequential packets each packet having address data defining an intended address, information data defining information to be transmitted and id data defining a source identity;

the network defining trains of sequential packet transport locations into which packets are loaded for transmission, such that some packet transport locations in a train contain packets and some packet transport locations are empty and such that, when there is more than one different source, the train contains packets from the different sources in a sequential arrangement as determined by the network;

from a statistical analysis of previous actual transmissions on the network, generating for the simulated source the required characteristic;

generating from the required characteristic a series of data elements each corresponding to a respective one of the packet transport locations and each specifying whether, in a simulated train of packets, a respective packet transport location is empty or whether the respective packet transport location contains a packet;

and creating from the data elements the simulated packet train.

Thus as set forth above, a methodology is disclosed for real-time traffic analysis, characterization, prediction, and classification in packet networks. The methodology is based on the simultaneous aggregation of packet arrival times at different time scales. The traffic is represented at the synchronous carrier level by the arrival or non-arrival of a packet. The invention does not require knowledge about the source, nor needs to decode the information contents of the packets. Only the arrival timing information is required. The binary representation of the traffic, that is, the arrival or non-arrival indicator, is processed by a series of processing units and organized in an array of vectors. The processing units are arranged in a series in such a way that the each processing unit operates with the result from the previous unit. The first processing unit operates directly with the timing information. The results of all the processing units are organized in the array of vectors and from these vectors information about the traffic can be derived. Statistical measures on the vectors such as variance, provide appropriate parameters at different time scales to calculate traffic descriptors. These descriptors encapsulate different properties of the traffic, such as burstiness and self-similarity, which were previously not considered in traffic management on packet networks.

A characterization is obtained of the traffic on packet networks suitable for a real-time implementation. The methodology can be applied in real-time traffic classification by training a neural network from calculated second order statistics of the traffic of several known sources. Performance descriptors for the network can also be obtained by calculating the deviation of the traffic distribution from calculated models. Traffic prediction can also be done by training a neural network from a vector of the results of a given processing against a vector of results of the subsequent processing unit; noticing that the later vector contains information at a larger time scale than the previous. The data produced by the algorithm can also be used for performance prediction.

BRIEF DESCRIPTION OF THE DRAWINGS

One embodiment of the invention will now be described in conjunction with the accompanying drawings in which:

FIG. 1 7 depicts a diagram of the competitive learning-based neural network that solves the data classification problem.

DETAILED DESCRIPTION OF A PREFERRED EMBODIMENT

Figure 1:
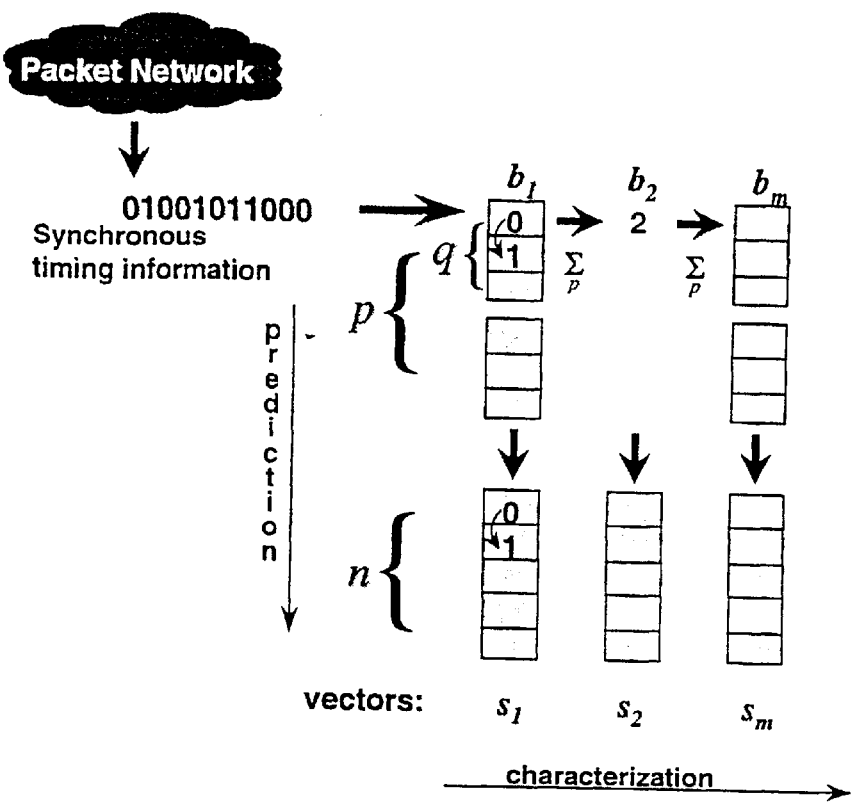
FIG. 1 illustrates the algorithm. The timing information from the synchronous line is represented by a '1' if a packet arrival has occurred, and a '0' otherwise. This information is processed and organized in vectors. The different components of the algorithm have been labeled.

Referring to FIG. 1, the data is processed and organized by an ordered series of bins, and stored in an ordered array of vectors in such a way that information can be derived regarding traffic at different time scales. Each bin consists of a primary accumulator and a secondary accumulator. A series of bits representing the presence "1" or absence "0" of a cell or packet in successive transport locations of a traffic stream is fed into the primary accumulator of the first bin of the series. The bins are labelled with the integers $\{1,2,\ldots,m\}$ and the accumulators are labelled by pairs of integers of the form (i,j) so that the accumulators in bin i are labelled (i,1) and (i,2) for the primary and secondary accumulators (respectively) of bin i. Each accumulator has a number of memory locations and the number of memory locations in accumulator (i,j) is represented by $p_j$.

When an accumulator receives an integer, it stores the integer in the next available (i.e. empty) memory location if one is available. If all of the memory locations are full, then the accumulator computes the sum of all the integers in its memory locations, outputs the result, clears (erases) all of its memory locations and writes the new integer into the first memory location. When a primary accumulator outputs an integer, it passes it to its corresponding secondary accumulator (i.e. the other accumulator in its bin) and to the primary accumulator of the next bin in the series. When a secondary accumulator outputs an integer, it passes it to the vector which corresponds to its bin (i.e. the vector labeled with the same index).

The array of vectors $s_c$ is used to store the information processed by the bins. Each vector can store n elements, where n>2 is a constant.

The bins are configured in two possible ways: a) as shift registers, or b) as recursive registers. The shift register receives a new element always in the first position and shifts down data already stored. The recursive register stores a new element in the position of the array that holds the oldest element by replacing it. In both cases, the oldest element is then sent to the vector $s_c$ for storage. Bin c is cleared every time it has received $q_c$ or $p_c q_c$ elements (depending on the case chosen) and a datum has been calculated.

Similarly, the vectors $s_c$ are configured in two possible ways: a) as an array of shift registers, or b) as an array of recursive registers. In the first case, a new element coming from bin c is stored in the first position of $s_c$ and the other elements are shifted. In the second case, a new element is stored in the position of the oldest element. In both cases the oldest element is dropped.

The algorithm is organized such that the integers passed to the vector $s_c$ of the array are the values of sums of $n_c$ successive bits of the binary stream fed into the primary accumulator of bin 1 where $n_c$ is given by $$n_c = p_{c2} \Pi_{t=1}^{c} p_{i1}.$$

These numbers thus represent the number of packets arriving in successive time intervals of duration $n_c$ each. We refer to $n_c$ as the bin count for bin c.

The vectors $s_c$ contain timing information at different time scales. This information can be used for characterization, prediction, and classification of traffic. In the case of OCn traffic analysis, the traffic can be encoded into a stream of '1's and '0's representing an arrival or non-arrival of a payload cell belonging to a particular VPI/VCI (virtual path identifier/virtual circuit identifier). Timing information of multiple connections is denoted by multiple bits. The time between two consecutive bits (or group of bits) is the minimum cell spacing time, i.e. maximum rate of the SONET line. This method can also be used to generate traffic from pre-loaded algorithms. This can be very useful for stress-testing switches.

In the special case of this algorithm where $p_{i1}=2$ and $p_{i2}32$ 1 for each bin i the bin counts are given by $n_c=2^2$. The algorithm starts with a stream of '1's and '0's as input. A '1' represents an occupied ATM cell in a traffic stream. Similarly, a '0' represents an empty cell (no data). The data stream is presented to an accumulator. The first element is simply placed in the primary accumulator of bin 1. When the second element arrives, it is placed in the accumulator, added to the previous element and the sum is stored in an N-element vector (array). The sum is also passed to the primary accumulator for the next bin (column) (which similarly adds every two inputs, stores the sum, and passes it to the next bin) (column). After an accumulator sum is stored, the accumulator is cleared (reset to 0) to await the next input. Since the number of elements (rows) in each vector (column) of the array is limited, when the limit is reached, an insertion pointer is reset to the beginning of the array (so that the next value stored overwrites the previous value). After a certain number of elements (or at the end of processing) each column calculates a variance measure of its array contents using the formula:

$$Var = \frac{crow * sumsq - sum^2}{crow * (crow - 1) * 4^{colnum}}$$

Where crow is the number of elements in the array, sum is the summation of the elements of the array, and sumsq is the sum of squares of the elements in the array. colnum is the identification number of the column (the first column has colnum=1, the second has colnum=2, etc.).

From the column variances, the Hurst-parameter is found by the formula $H=1-\beta/2$, where $\beta$ represents the slope of the variance-time curve on a log-log scale. Thus, the steeper the variance-time curve is, the smaller the corresponding Hurst-parameter value must be.

A first method of constructing the traffic stream is based on the comparison between the timestamp of the most recent cell to the timestamp of the previous cell. This would indicate how much time has elapsed between cells. This interval could then be divided by the minimum cell interval (for 1%OC-3, 0.00028 seconds) to determine how many 1%OC-3 cell periods had elapsed (these would be the number of 0's to insert into the array before inserting a 1. The major drawback of this method is that it would require floating-point division (as fractions of intervals would have to be taken into account). The resulting implementation missed cells while the processor was busy doing the floating-point operation.

A second method involves no floating-point operations at all. In the algorithm, a '1' or a '0' is input to the accumulator for the first column once every 0.00028 seconds (one 1%OC-3 cell interval time). Since the second column accumulator receives the sum of two numbers in the first, its rate is half of the previous column (it receives an input every 0.00056 seconds). Continuing this to the fifth column, its accumulator receives a new value once for every 32 cell inputs ($2^5$), so its 'arrival interval' is actually 32 1%OC-3 cell arrival times (0.00896 seconds). When the first cell arrives, its timestamp Ts_1 is noted, and the end of the first interval Ts_end (Ts_1+CPU_clock-ticks_for_$2^5$_cells) is calculated. The interval cell count is initialized to 1. When the next cell arrives, its timestamp is compared to the end of interval value. If the timestamp is less than Ts_end, the cell has arrived within the interval, and the cell count is incremented. If the timestamp is greater than Ts_end, the interval is over. The interval counter is inserted into the H-meter algorithm (this time at the fifth column) and the counter is then cleared. The next end of interval is calculated as Ts_end+CPU_clock-ticks_for_$2^5$_cells. This method counts the number of cells that arrive within a certain time period. It eliminates the work of the first four columns, and involves no floating-point calculations in constructing the traffic stream Preparation of the Data: A device that prepares the information for the algorithm is a network interface card capable of generating and capturing, in real-time, ATM traffic at OC-3 rates. The card generates and captures traffic using a traffic profile which records the timing information of an ATM traffic stream, without any retention of the specific payload data within the cells. The card is capable of generating and capturing traffic from 3 virtual circuits (VC).

At the heart of the capture/generation card, is an FPGA. The FPGA performs the ATM cell processing tasks, as well as serving as the controller of operation of the card. A microcontroller and an interface to a personal computer serial port are incorporated on the card.

An ATM physical layer device supplies captured cells to the FPGA. This component also allows for ATM cell transmission, if enabled. RAM on the card stores the look-up table for the headers the card is expected to capture. Logic on the card permits it to be plugged into the PCI slot of a PC, allowing a means of storing to disk the captured ATM traffic patterns.

The representation of the ATM traffic stream in the traffic profile file is based on encryption of the ATM cell header; the cell payload is ignored. During traffic capture, the payload is dropped and for traffic generation, the payload of the outgoing cells is hard-coded with a predetermined value. The encoding scheme allows representation of the headers from number of active VCs (currently 3) as well as that of an idle/unassigned cell. By combining this encrypted traffic profile with a lookup table containing the specific byte values of the headers for each of the active VCs, one is able to reproduce the timing of a traffic stream with specific properties.

For traffic generation, the card is supplied with a desired traffic profile, encoded as described above, and a set of 3 ATM cell headers. As generation proceeds, the traffic profile is decrypted and the specified headers loaded into the outgoing SONET frame. As mentioned previously, the ATM cell payload is not considered, but is fixed to some predetermined value. Since on-board storage of the traffic profile is finite, either a traffic stream will be fed to the card via a PCI bus or a stored traffic stream will be cycled repeatedly, with a period of approximately half a second for 3 VCs.

Configuration of the board for traffic capture produces a traffic profile file, which is written to disk on a PC. Before capture can begin, a set of three ATM headers must be downloaded to the board for the lookup table. These headers are used for comparison with each header extracted from the incoming SONET frame. A match between a received header and one from the look-up table results in a label being assigned in that cell period. Headers which do not match those in the table are labeled as that of an idle/unassigned cell. In this manner of header extraction, comparison and filtering, and labeling, the timing information from the incoming ATM stream can be recorded.

The card resides in a PCI slot (33 MHz, 5V) of a personal computer. Also required for operation of the card is a connection to a PC's RS-232 serial port. When configured for traffic capture, the captured traffic profile will be written to hard disk at a rate of approximately 0.5 Gbyte/hour. The board's optical driver requires a multi-mode, 1300 nm wavelength, SC-style fiber optic connection.

Figure 2:
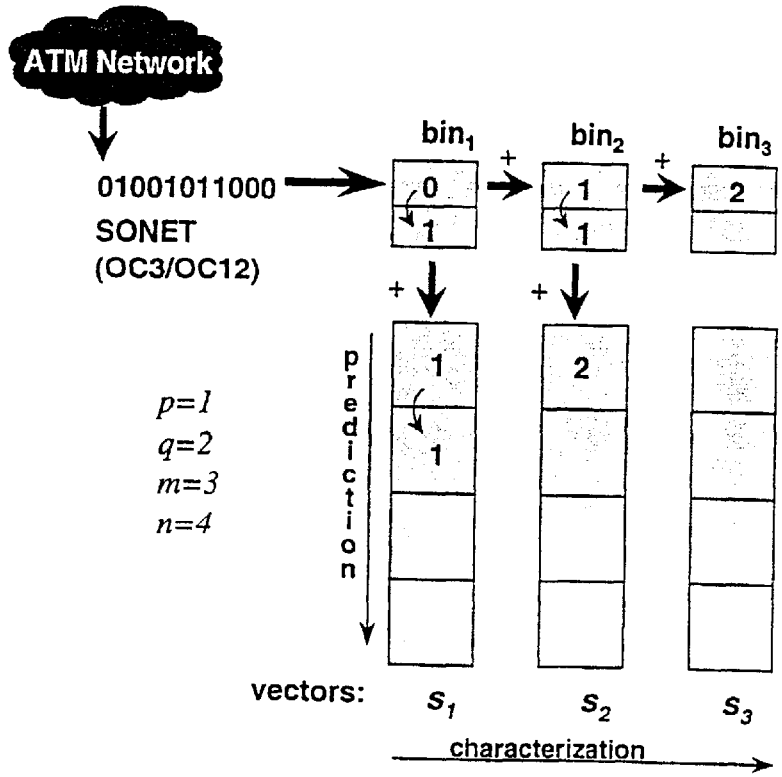
FIG. 2 shows an application of the algorithm in ATM networks. This is a particular case of the algorithm. The required values of the parameters are shown in the figure. The input information is SONET OC3/OC12, which is a standard synchronous carrier for ATM.
Figure 3:
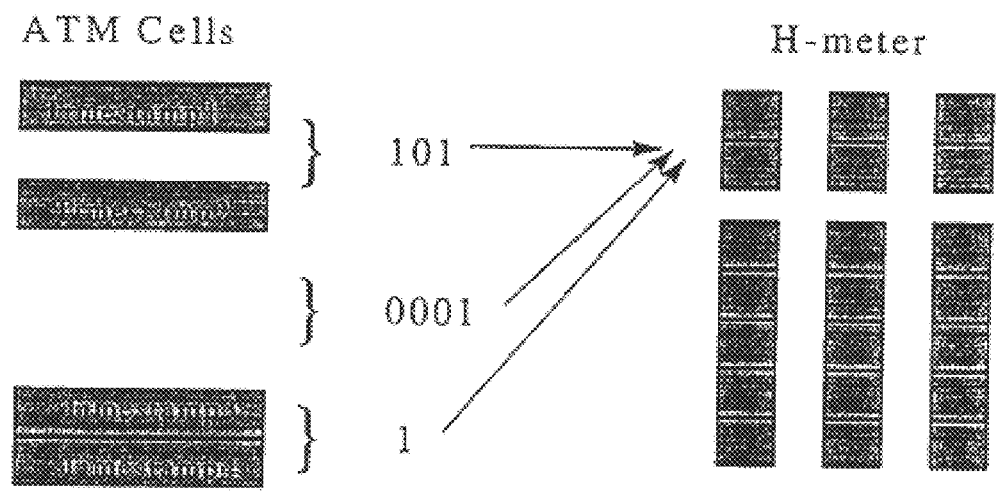
FIG. 3 is a diagram showing the first method used to construct the H-meter algorithm input stream of 1's and 0's from ATM capture cell timestamps.
Figure 4:
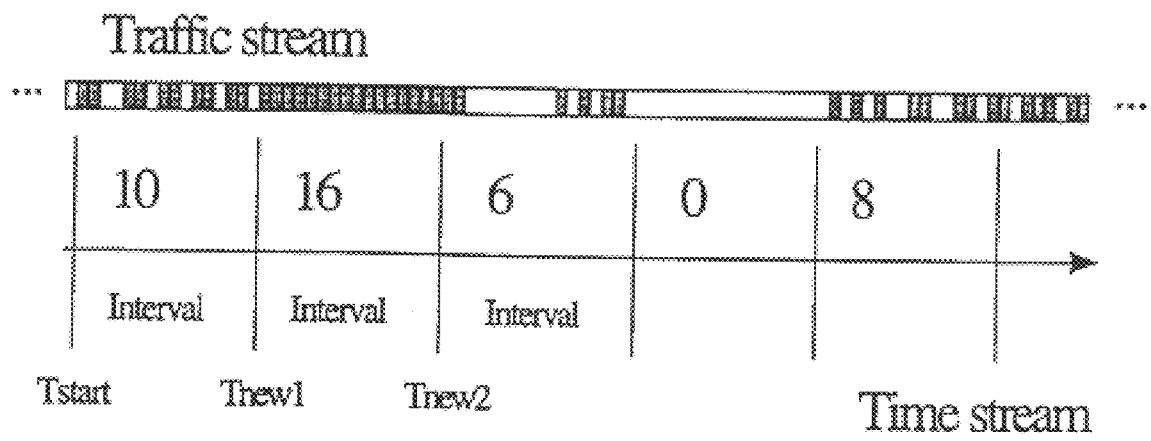
In FIG. 4 illustrates the second method of re-producing the ATM traffic stream. This method eliminates the first four columns of the array.
Figure 5:
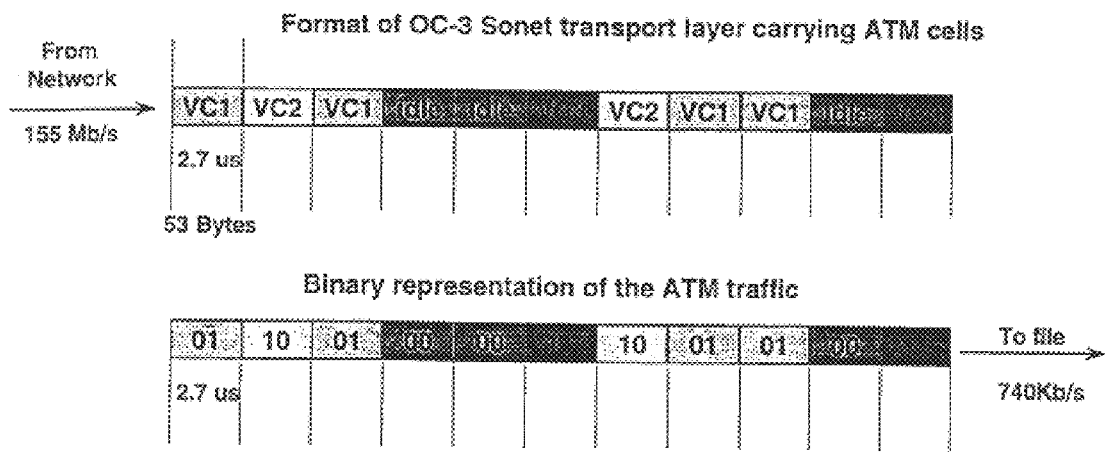
FIG. 5 describes the data representation process.
Figure 6:
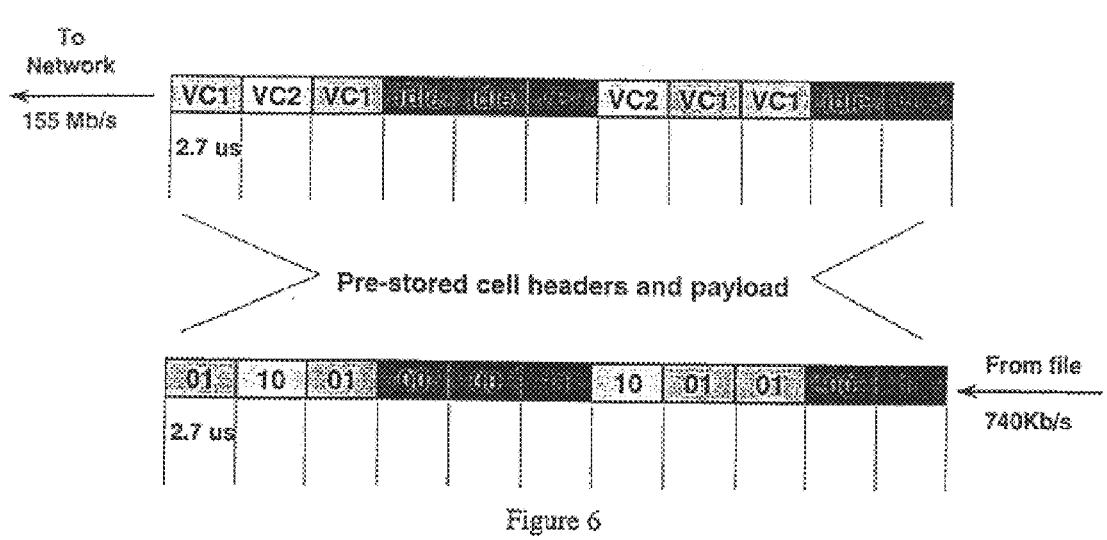
FIG. 6 describes the data generation process.
Figure 7:
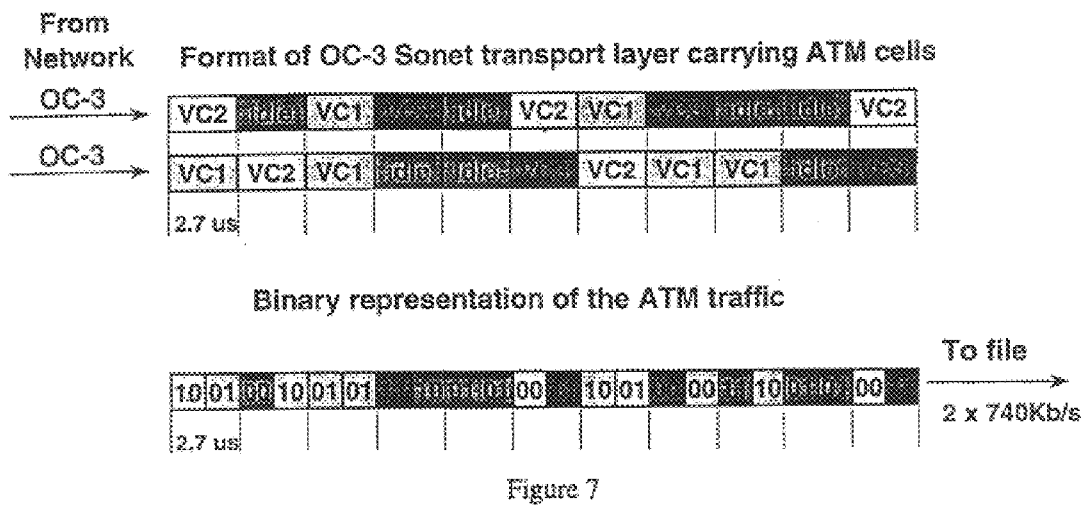
FIG. 7 represents the data representation process for two channels.
Figure 8:
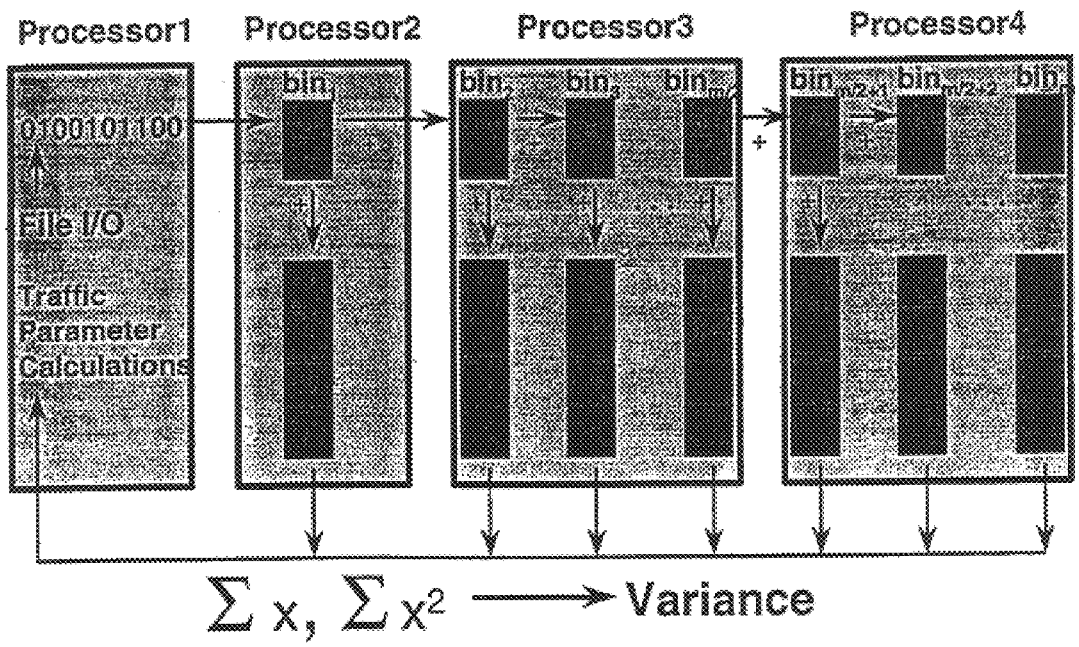
FIG. 8 shows a block diagram of the implementation of the algorithm in a parallel processing platform with four processors.
Figure 9:
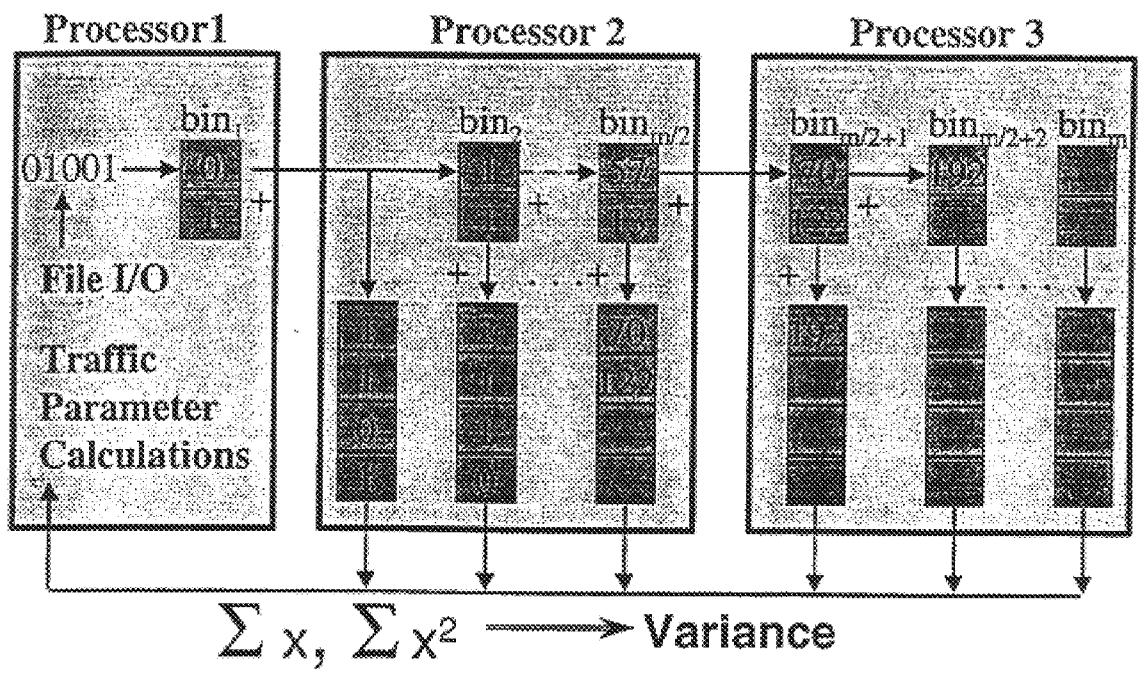
FIG. 9 shows a block diagram of an optimized implementation of the algorithm in a parallel processing platform with three processors.

Implementation for ATM over OC-3: An implementation of the algorithm for where $p_{i1}=2$ and $p_{i2}=1$ is shown in FIG. 2. The bin counts are given by $n_c=2^c$. The shift register configuration has been used for the bins and the vectors. The input is SONET information converted into a binary stream. This information is stored and organized in an array of bins and vectors.

The data is processed as follows. Bin 1 receives two bits, adds them up, and sends the result to the vector $s_1$ and to bin 2. Since bin 2 is not full yet, then two more bits are read into bin 1 and the result sent to $s_1$ and to bin 2. This new result is stored in the first position of $s_1$ and of bin 2, while the previous values are shifted. Since bin 2 is now full, the two elements are added and the result send to $s_2$ and to bin 3.

Traffic Characterization: Several calculations can be performed on the vectors $s_c$ to characterize the traffic, for example first order statistical measures like variance, correlation, and the coefficient of variation, or second order statistics like the Hurst parameter H and other fractal dimensions. A methodology using variance-time curves is utilized as follows. The vector v of variances is calculated where each element $v_c$ contains the variance of the elements in the vector $s_c$. The variances are scaled by dividing each element by the square of bin count. The information is represented by a plot of the logarithm of v versus the logarithm of the bin count. The traffic can then be characterized by parameterization of the variance-time curves. For example, the slope of the variance-time curve is related to the Hurst parameter.

Figure 10:
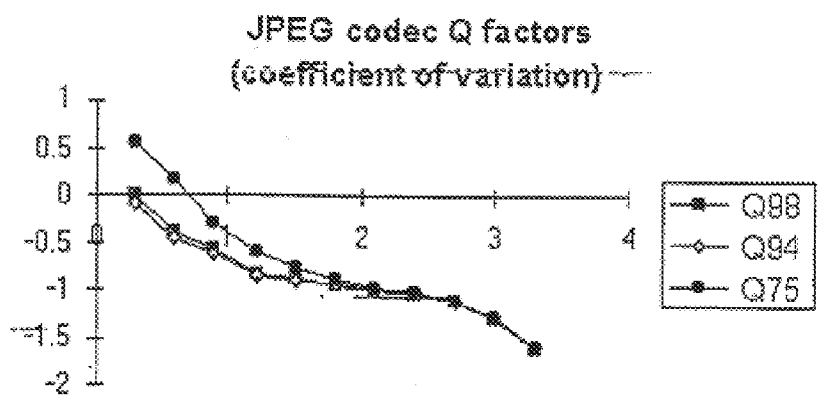
FIG. 10 depicts an application of the algorithm in characterization of moving images. The coefficient of variation of the vectors has been plotted for different quality factors of the transmission. The plot shows the logarithm of the coefficient of variation of the vectors against the logarithm of the 2 to the power of the vector number. Using this technique it can be determined how the statistical properties of the traffic vary as a function of the quality level of the video compression.
Figure 11:
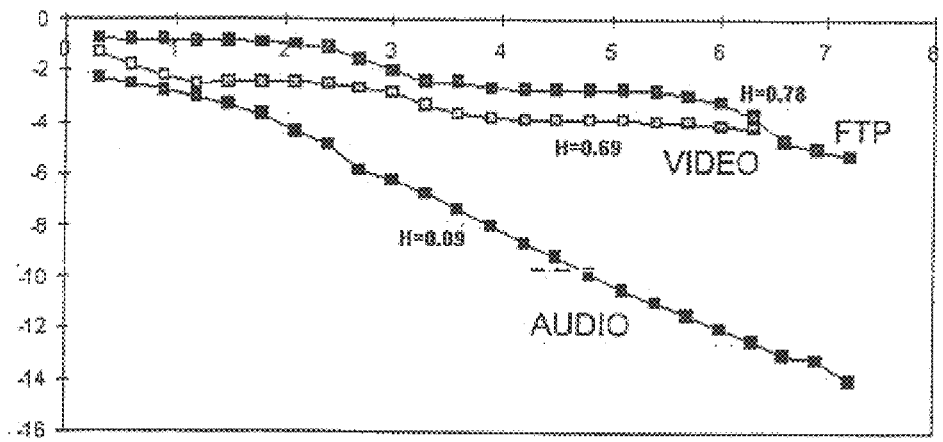
FIG. 11 illustrates an application of the invention in traffic classification. The vertical axis is the log of the variance, and the horizontal axis is the log of the bin size index. The plots represent typical variance-time curves of transmissions of video, audio, and ftp (file transfer protocol) signals. A variance-time curve is a plot of the logarithm of the variance of the vectors against the logarithm of two to the vector number. The plot for each stream is clearly distinct from the others. Since the plots can be constructed in real-time as the vectors are being calculated, this technique can be applied in real-time to characterize the traffic from measures of the variance-time curves.

An example of a real-time plot of the coefficient of variation is shown in FIG. 10. The curves represent JPEG video traffic at different quality factors. FIG. 11 illustrates an application of the invention in traffic classification. The vertical axis is the log of the variance, and the horizontal axis is the log of the bin size index. The plots represent typical variance-time curves of transmissions of video, audio, and ftp (file transfer protocol) signals. A variance-time curve is a plot of the logarithm of the variance of the vectors against the logarithm of two to the vector number. The plot for each stream is clearly distinct from the others. Since the plots can be constructed in real-time as the vectors are being calculated, this technique can be applied in real-time to characterize the traffic from measures of the variance-time curves.

Figure 12:
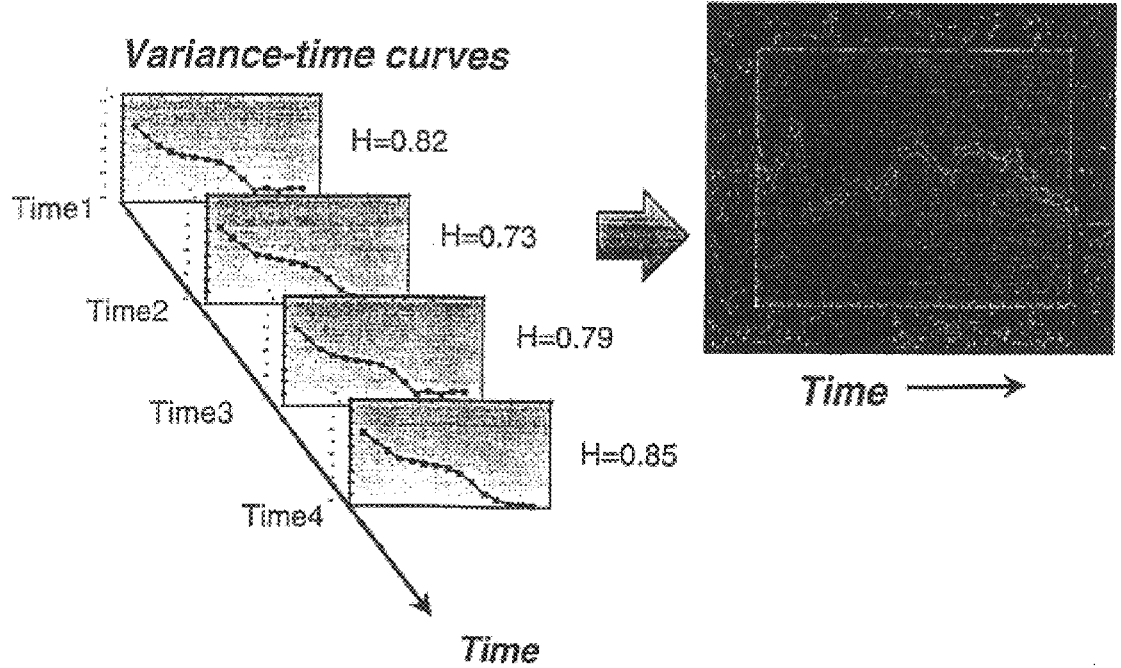
FIG. 12 illustrates the process of generating the Hurst parameter H from variance time curves. The Hurst parameter is calculated at different time intervals and a plot is constructed with the different values of H. The resolution of the graph depends on the lenth of the time intervals.

The process which generates the Hurst parameter from variance time curves is illustrated in FIG. 12. The Hurst parameter is calculated at different time intervals and a plot is constructed with the different values of H. The resolution of the graph depends on the lenth of the time intervals.

Figure 13:
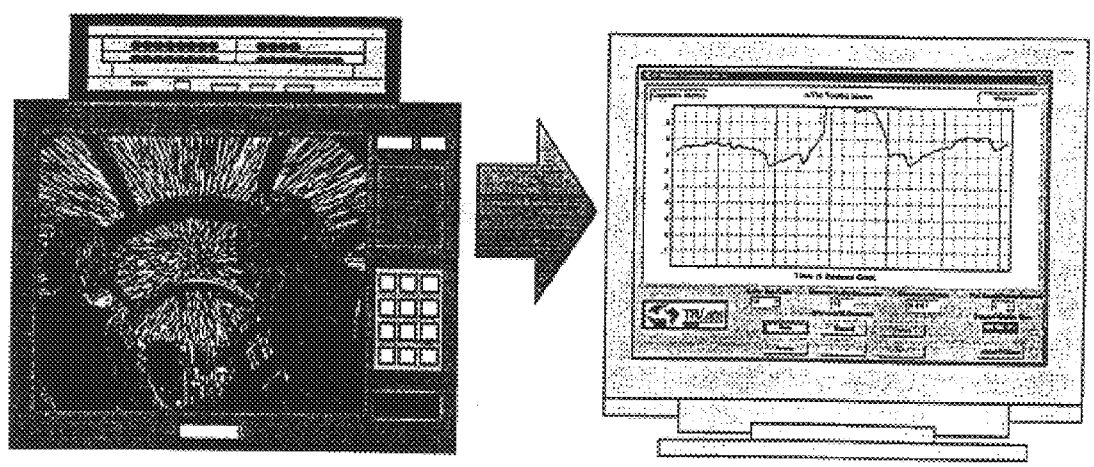
FIG. 13 shows an application of the algorithm for calculation of the H parameter of the 'jump to hyperspace' scene of the StarWars movie. At the centre of the plot (left-hand side image) it is seen that the H parameter increases in value as the images changes. This is a motion JPEG encoded transmission of the video over an ATM network.

FIG. 13 shows an application of the algorithm for calculation of the H parameter of the 'jump to hyperspace' scene of the StarWars movie. At the centre of the plot (left-hand side image) it is seen that the H parameter increases in value as the images changes. This is a motion JPEG encoded transmission of the video over an ATM network.

Figure 14:
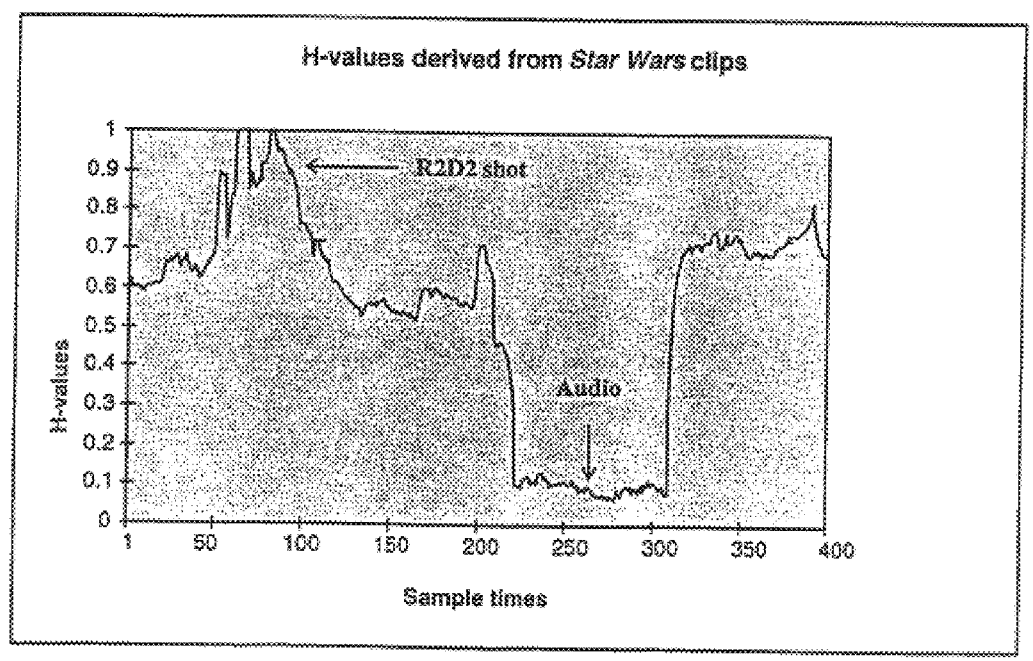
FIG. 14 illustrates the application of the algorithm in classification of different traffic streams. A scene with the character R2D2 from the motion JPEG-coded StarWars movie over ATM is compared agains an audio transmission of the same movie.
Figure 15:
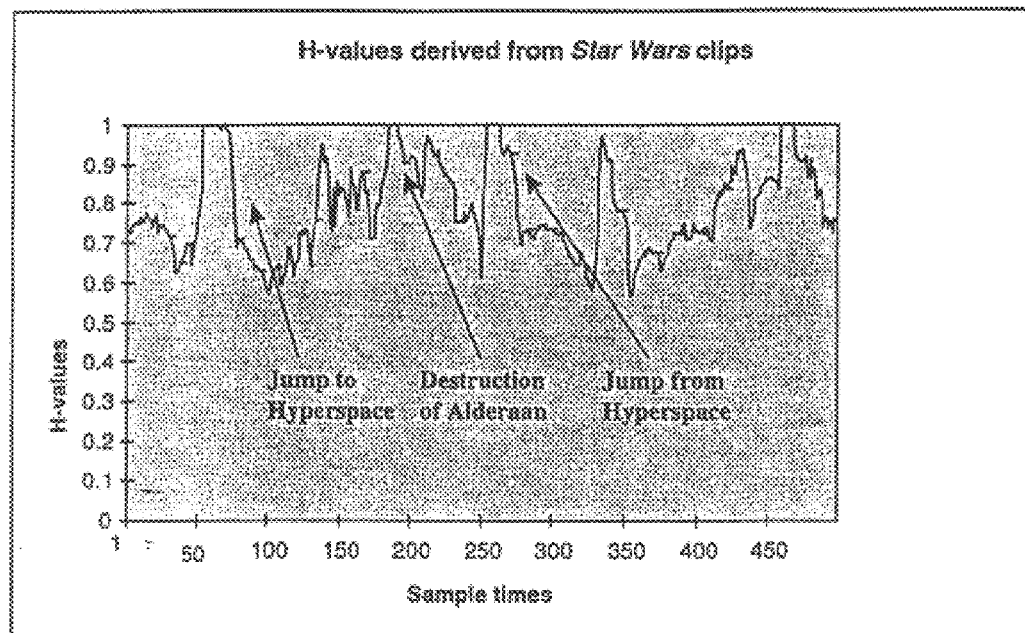
FIG. 15 shows that application of the algorithm to the observation of scenes of high activity from the motion JPEG-coded StarWars movie.

FIG. 14 illustrates the application of the algorithm in classification of different traffic streams. A scene with the character R2D2 from the motion JPEG-coded StarWars movie over ATM is compared agains an audio transmission of the same movie. Similarly FIG. 15 shows that application of the algorithm to the observation of scenes of high activity from the motion JPEG-coded StarWars movie.

The Hurst parameter (H parameter) provides information about the nature of the traffic additional to that which is currently available in the standards. It is a measure of the rate of change of burstiness with respect to changes in time scale. The contribution of the present algorithm for traffic characterization applications is the ability to calculated the H parameter in real-time.

Traffic Classification: The characteristics of different traffic streams can be characterized by variance-time curves. A set of variance vectors v for different traffic streams can be used to train a classifier, for example a neural network. The variances can be calculated in real-time from the array of vectors $s_c$ and the classification can be perform at regular time intervals, for example every second. This information can be used for monitoring.

An example of traffic classification using variance-time curves is shown in FIG. 11. The signals represent FTP (top), video (center), and audio (bottom) over ATM. The signals have been characterized by the Hurst parameter H.

The data in its original form, shown in FIG. 11, was presented to several network architectures in attempt to solve the classification problem. However, it was determined that the strong linear trends in the time series made it impossible for the network to learn the subtle variations in the data.

To transform the data into a suitable form for presentation to the network, the three time series of FIG. 11 were detrended. As the time series appear to be linear, first order detrending techniques were suitable. Two methods of detrending were considered; (i) a least-mean-square fit of a line to the data and (ii) detrending by finding the correlation of each series. Both methods removed the linear trends from the time series.

The least-mean-squares method of detrending is well known. The slope and the intercept of a line that models the data were determined. Using the slope and intercept, the trend component of each element in the series was determined and then removed from the original series, as shown in the equation below. When the data was prepared in this form, it was possible to design a network that could classify the three data types.

$$S_d = S_i - (\text{slope} * t_i + \text{intercept})$$

where: $S_d$=the detrended signal
$S_i$=the original signal
slope=the slope of the model of the line
$t_i$=time corresponding to the sample point, i
intercept=the y-intercept of the line that models the data curve It can be seen from FIG. 11 that audio data is highly correlated, video data is less but somewhat correlated and FTP data shows almost no degree of correlation.

Noticing that the three data types could be distinguished by their degree of correlation, a simpler method of detrending is provided in which firstly the slope and the intercept of each time series is calculated. Each time series is then detrended as follows $$S_d = |S_i - S_{i+1}| + \text{intercept}$$

Figure 16:
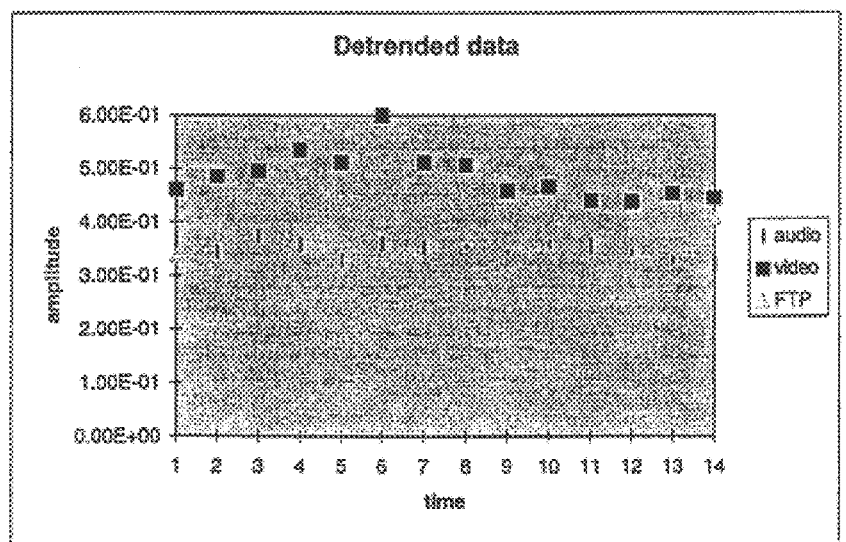
FIG. 16 shows the detrended data as presented to the neural network classifier.

This method finds the correlation of the signal by taking the absolute difference in successive signal amplitudes. This value is then raised by the intercept of the line that models the data curve. When the data is detrended in this manner, it is possible to design a network that could classify the three data types. Signals detrended by this method are shown in FIG. 16.

Although data detrended by the method of least-mean-squares allowed a network to classify the data, the second method of detrending is less computationally intensive. The second method is equally successful in removing the linear trend information and it involved only addition and subtraction operations whereas the method of least-mean-squares involved a multiplication operation. Reducing the complexity of preprocessing is targeted to classify the data in real-time.

In order to solve this data classification problem, three neural network architectures can be attempted. First, a multi-layer feed-forward network may be considered. The weights are updated using a back propagation algorithm. However, it is not possible to determine a network of this type that could learn to classify the input vectors. Even using momentum, the network's sum-squared error becomes stuck in a local minimum and is never able to reach the error goal.

Next, a LVQ (Linear Vector Quantization) network can be designed. The network consisted of 15 inputs, 3 tan-sigmoidal neurons in the hidden layer and 3 linear output neurons. This network is able to successfully classify the three data types.

Figure 17:
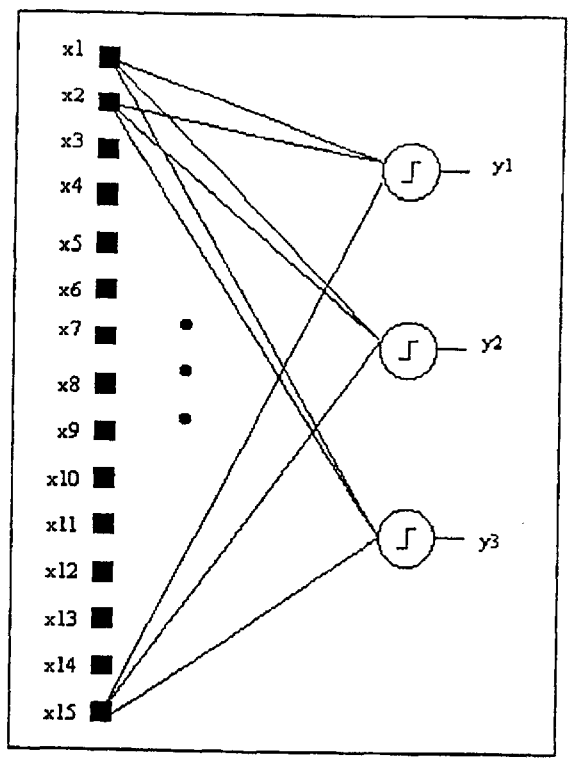
Figure 18:
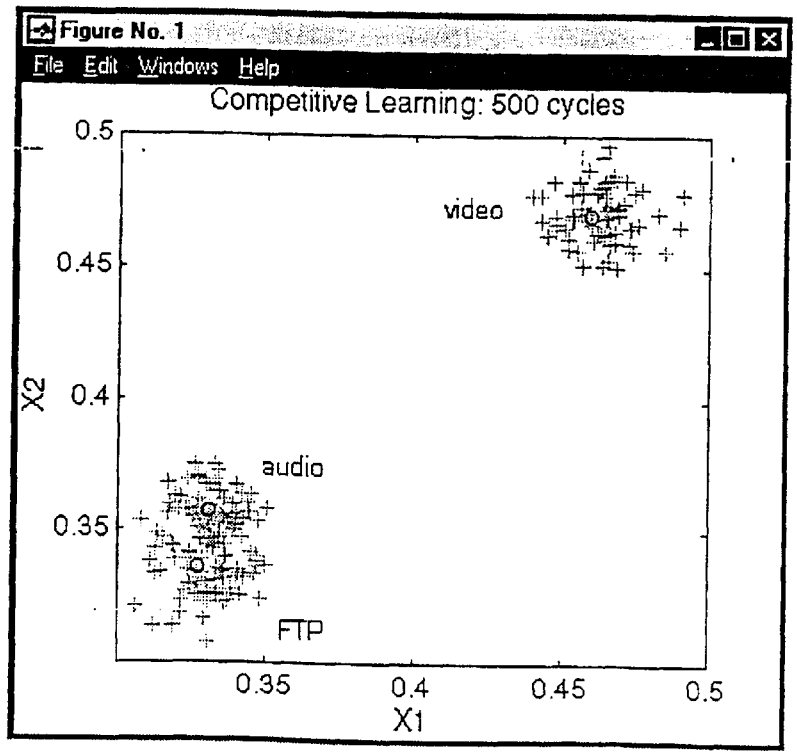
FIG. 18 shows the after-training weight vectors of the neural network classifier indicated by a 'o', and input vectors indicated by a '+'.

Although it is not obvious by observing the input vectors of FIG. 16, the three classes of input vectors are linearly separable. This is determined by experimenting with a third network; a competitive network. The competitive network that solves this problem is shown in FIG. 17. The network consists of 15 inputs and 3 perceptrons in the output layer. As perceptrons are able to classify the three data types, it is determined that the data must be linearly separable. This network architecture is favored over the LVQ design as it involves fewer weights and neurons. It can been seen FIG. 18 that the competitive network found the three data clusters.

Twenty percent of the input vectors are set aside for testing. Once training was completed, the network is tested on the remaining 600 input vectors. After 500 training epochs, the network is able to classify all 600 input vectors into three classes without error.

Traffic Prediction: The array of vectors $s_c$ can be used to predict traffic. A set of vectors $s_{j-1}$ and $s_j$ can be used as a training set for a neural network predictor. Once the neural network is trained it can take the input from a vector $s_{j-1}$ in real-time and predict elements of $s_j$. This information can be used by different layers of protocols to handle congestion, call admission control, and in general to monitor a source.

Performance Prediction: The following describes a method for estimating the maximum rate of constant bit rate traffic which can be added to a given traffic stream without overflowing a buffer of fixed size during a time window of fixed duration. Let $\mu$ denote the rate at which cells are removed from a buffer of size B and let $A_{st}$ denote the number of cells which arrive to the buffer in the time interval (s,t). It is well known that the queue length (i.e. the number of cells in the buffer) at time t is given by $$\max_{s \leq t}$$

Figure 19:
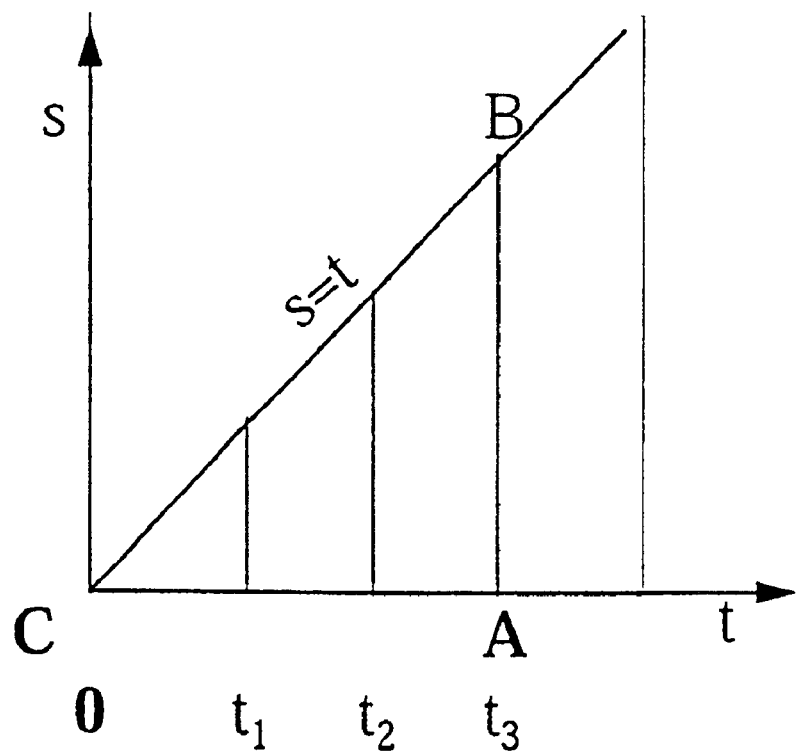
FIG. 19 illustrates one method of calculating maximum queue length.

$W_{st}$ where $W_{st}=A_{st}-\mu(t-s)$. For example, in FIG. 19, suppose that we know $W_{st}$ for every point (s,t) in the plane. The queue length at time $t_3$ is the maximum value of $W_{st}$ along the line segment AB of FIG. 19.

Figure 20:
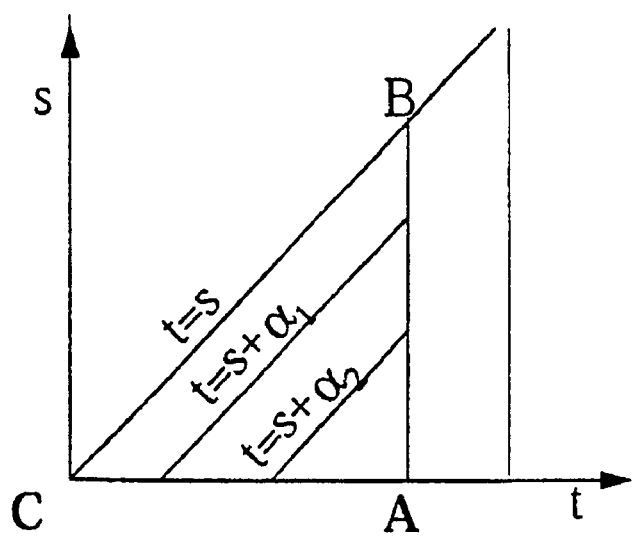
FIG. 20 illustrates the method of calculating maximum queue length employed in the estimation of effective bandwidth.

If the maximum queue length is required in the interval $(0,t_3)$, we can simply take the maximum of $W_{st}$ along all the line segments parallel to AB (for example at $t_1$, $t_2$ etc.) and then find the largest of those maximum values. However, this is equivalent to just taking the maximum of $W_{st}$ over the entire triangular region ABC. We can envision taking this maximum in a different way, as illustrated FIG. 20 We first find the maximum of $W_{st}$ along each of the line segments parallel to CB (for example , the segments labeled t=s, t=s+$\alpha_1$, t=s+$\alpha_2$) and then find the largest of those values.

If we find the maximum in this way, we can express the maximum number of cells in the buffer during the time interval (s,t) by the following:

$$M_{st}(\mu) = \max_{v \in (s,t)} \left\{ \max_{x \in (s,v)} W_{uv} \right\} = \max_{\alpha \in (0,t-s)} \left\{ \max_{x \in (s,t-\alpha)} W_{x,x+\alpha} \right\} = \max_{\alpha \in (0,t-s)} \left\{ \max_{x \in (s,t-\alpha)} A_{x,x+\alpha} - \mu\alpha \right\}.$$

We now employ a heuristic approximation:

$$\max_{x \in (s,t-\alpha)} A_{x,x+\alpha} \cong m_{st}^{\alpha}$$

where $$m_{st}^{\alpha} = \max_{j=1,2,\ldots,\lfloor \frac{t-s}{\alpha} \rfloor} A_{s+(j-1)\alpha,s+j\alpha}$$

and where $\lfloor x \rfloor$ denotes the largest integer not larger than x (i.e. the floor function or truncation ). In words, $m_{st}^{\alpha}$ is defined as follows: Divide the time interval(s,t) into a number of smaller , non-overlapping intervals of length $\alpha$. Count the number of cells arriving in each of those small intervals and find the maximum of those numbers. The result is $m_{st}^{\alpha}$. The exact calculation is similar, except that the intervals are overlapping. For example, if $\alpha=4$, s=0 and t=16, the approximate calculation uses the intervals (0,4), (5,8),(9,12) and (13,16) whereas the exact calculation uses the intervals (0,4),(1,5),(2,6),(3,7), . . . ,(12,15) and (13,16). In the exact calculation $$\max_{x \in (s,t-\alpha)} A_{x,x+\alpha}$$

we take the maximum value of $A_{x,x+\alpha}$ for all possible values of x (i.e. x=s,s+1,s+2, . . . ,t-$\alpha$). In the approximation $m_{st}^{\alpha}$, we take the maximum of only the values of $A_{x,x+\alpha}$ corresponding to disjoint intervals (x,x+$\alpha$) (i.e. x=s,s+$\alpha$,s+2$\alpha$, . . . ,t-$\alpha$).

The calculation of the values $m_{st}^{\alpha}$ can be done efficiently in real time using a method similar to that described above for the calculation of the variance-time curve. We employ a series of m bins labelled 1,2, . . . ,m. Each bin is made up of two processing units which can store one integer each. A stream of bits representing the presence "0" or absence "1" of a cell (packet) in each transport location is fed into the first bin. Each bin begins in a cleared state, with no integer stored in either processing unit. If a bin in a cleared state receives an integer, it stores the integer in the first of it's processing units. If a bin which is not in a cleared state (i.e. it has an integer stored in one of it's processing units) receives an integer, it will place the new integer in its second processing unit, calculate the sum of the two integers in its processing unit and pass the sum to the next bin (i.e. bin 1 passes to bin 2, bin 2 passes to bin 3 etc.). The result of this process is that, at any time, an integer stored in a processing unit of bin c represents the sum of $2^c$ consecutive bits fed into the first bin. This in turn corresponds to the number of cells (packets) arriving in a time window of duration $2^c$. The bin also passes this sum to a maximum filter (described below) and returns to a cleared state, erasing the contents of both processing units.

Associated with each bin is a maximum filter. We thus have m maximum filters labelled 1,2, . . . m in the same way as the bins. Each maximum filter consists of an input port, a memory, a counter, an alarm and an output port. Each of these four elements can store one integer. When an integer arrives at the input port of a maximum filter from its corresponding bin, the filter compares the integer in the input port to the integer in memory. The filter then discards the smaller of the two integers, moves the larger of the two integers into its memory, increments the integer in its counter by 1 and compares the counter to the alarm. If the integers match, then the integer in memory is moved to the output port, thus overwriting the integer in the output port, and the integer in memory is set to 0.

Associated with each bin is a vector similar to the vectors $s_c$ described in the method for calculating variance-time curves. Each integer which appears at the output port of maximum filter c is passed to vector $s_c$ which records integers passed to it in sequence, dropping the least recent ones when full. If $\alpha$ is an integral power of 2, say $\alpha=2^c$, then $m_{st}^\alpha$ is the maximum of the most recent $$\left\lfloor \frac{t-s}{\alpha} \right\rfloor$$

integers passed to maximum filter c. In practice $$\left\lfloor \frac{t-s}{\alpha} \right\rfloor$$

may be quite large when $\alpha$ is small and so we can not store all $$\left\lfloor \frac{t-s}{\alpha} \right\rfloor$$

elements at once. This is the reason for the maximum filters. The value of $m_{st}^\alpha$ can be obtained by finding the maximum of the most recent $$\left\lfloor \frac{t-s}{\delta} \right\rfloor$$

integers in the vector $s_c$ where $\alpha=2^c$ providing that the alarm in maximum filter c is set to $\delta/\alpha=2^{-c}\delta$. We assume that $\delta$ is an integral power of 2, say $\delta=2^d$, so that the alarm in filter c must be set to $\delta/\alpha=2^{d-c}$. This effectively breaks up the calculation of $m_{st}^\alpha$ by dividing the interval(s,t) into a number of smaller intervals of length $\delta$, taking the maximum over each of the smaller intervals and calculating $m_{st}^\alpha$ as the maximum of those.

In this manner we can easily keep track of the values of $m_{t-\Delta,t}^\alpha$ for any value $\Delta$ of interest for $\alpha=1,2,4,\ldots$ where t represents the current time. We are interested in the maximum number of cells in the buffer in the time interval $(t-\Delta, t)$ which is given by $$M_{t-\Delta,t}(\mu) = \max_{\alpha \in (0,\Delta)} \{m_{t-\Delta,t}^\alpha - \mu\alpha\}.$$

For each value of $c=1,2,\ldots,m$ we have a value of $m_{t-\Delta,t}^\alpha$ where $\alpha=2^c$. We subtract $\mu\alpha=2^c\mu$ from this value for each of $c=1,2,\ldots,m$ and find the maximum of the m resulting values. We estimate $M_{t-\Delta,t}(\mu)$ by fitting a quadratic function to a small number of points of the form $(\alpha, m_{t-\Delta,t}^\alpha - \mu\alpha)$ with values of $\alpha$ centred around the integral value of $\alpha$ where the maximum occurred. The operation referred to as "fitting a quadratic function" refers to finding the parameters of a quadratic curve which passes through or as near as possible to the points in question. Methods for fitting a quadratic function are available in the literature.

Note that it is only the last step which depends on the value of $\mu$, the service rate for the buffer. We can thus repeat the last step for a number of different values of $\mu$ without having to repeat the measurements involved in filling the vectors $s_c$.

The effective bandwidth is defined as the minimum value of $\mu$ for which the maximum number of cells $M_{t-\Delta,t}(\mu)$ in the buffer does not exceed the buffer capacity B for the duration of the time window of length $\Delta$. We can calculate this quantity at any time by performing a binary search for this value of $\mu$. A binary search consists of evaluating the function $M_{t-\Delta,t}(\mu)$ for two values of $\mu$, say $\mu_L$ and $\mu_R$, and continually updating the values of $\mu_L$ and $\mu_R$ such that the size of the interval $(\mu_L, \mu_R)$ is decreased by half at each iteration and always contains the value of $\mu$ for which $M_{t-\Delta,t}(\mu)=B$. The method of binary search is well known and can be found in the literature.

Projection of Long Term Effective Bandwidth: Let $\mu_{eff}(t, \Delta, B)$ denote the effective bandwidth described above: i.e. $\mu_{eff}(t,\Delta,B)$ represents the minimum value of $\mu$ for which $M_{t-\Delta,t}'(\mu) \leq B$ where $M_{t-\Delta,t}'(\mu)$ denotes the approximation described above for the maximum number of cells in the buffer during the time window $(t-\Delta,t)$. Suppose that at time t we have been observing a traffic stream for some length of time $\omega$ and wish to estimate the bandwidth $\mu_{eff}(t,\Omega,B)$ required to prevent buffer overflow during some time window of length $\Omega$ where $\Omega > \omega$. We will assume that $\omega = 2^J \delta$ for some integer J (otherwise we can simply decrease $\omega$ accordingly). Now define $E_k(t,\mu)$ to be a measure of the average value of $M_{t-\Delta,t}'(\mu)$ over the interval of length $\omega$ when $\Delta = 2^k \delta$. Specifically:

$$E_k(t, \mu) = 2^{-(J-k)} \sum_{i=1}^{2^{J-k}} M'_{t-i2^k\delta,t}(\mu).$$

In words, we divide the interval of length $\omega = 2^J\delta$ into $2^{(J-k)}$ intervals of length $\Delta = 2^k\delta$ and estimate the maximum queue length over each of these intervals. The average of these values is $E_k(t,\mu)$. In practice we have seen that the variation of $E_k(t,\mu)$ with k can be approximated by the following relation:

$$\log_2[E_k(t,\mu)] \approx a(t,\mu) + kb(t,\mu).$$

Thus if we fix t and $\mu$ and plot the logarithm of $E_k(t,\mu)$ as a function of k, we get something that looks close to a straight line. Our method for projecting the effective bandwidth over the long term $\Omega$ consists of estimating the coefficients $a(t,\mu)$ and $b(t,\mu)$ by fitting the points $(k, \log_2[E_k(t,\mu)])|k=0,1,\ldots J$ to a straight line and then extrapolating a value for $M_{t-\Omega,t}(\mu)$ by extending the line out further. Fitting a straight line consists of finding the line that passes closest to the points and methods for doing this are available in the literature. We thus estimate $M_{t-\Omega,t}(\mu)$ according to:

$$\log_2[M_{t-\Omega,t}(\mu)] \approx a(t,\mu) + \log_2[\Omega]b(t,\mu).$$

Figure 21:
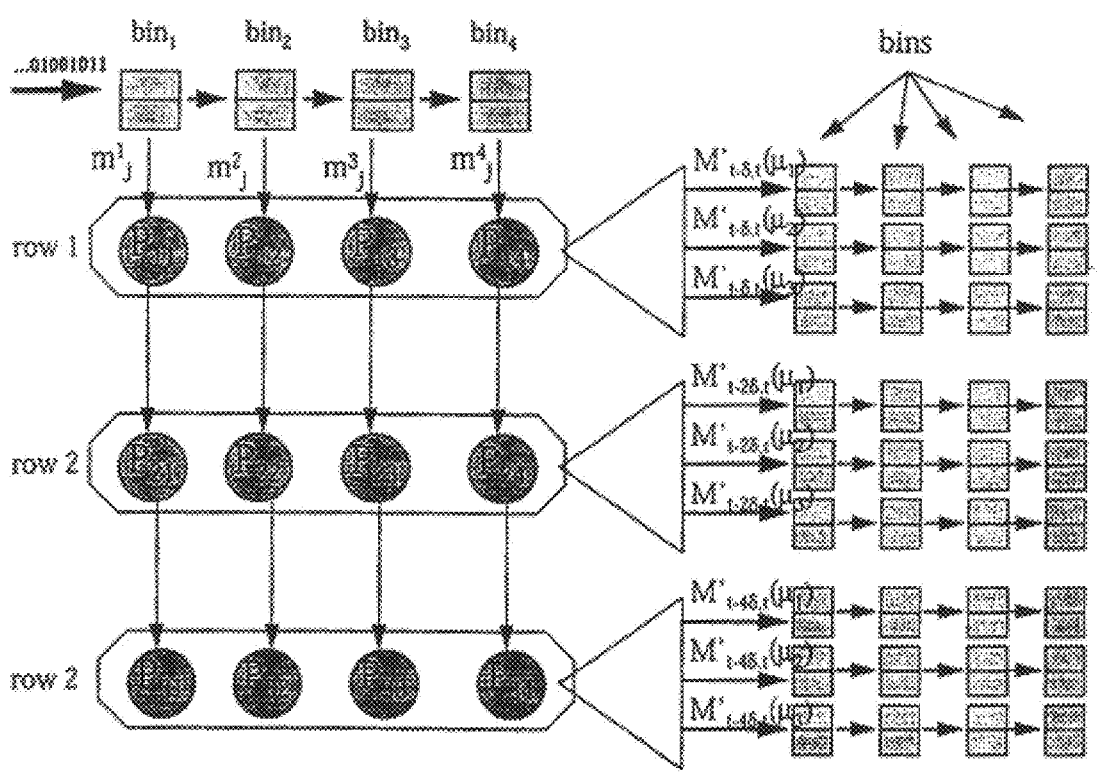
FIG. 21 illustrates the calculation of the long term effective bandwidth projection.

Efficient Calculation of $E_k(t,\mu)$: We can calculate the values of $E_k(t,\mu)$ efficiently in real-time as follows. Let $m_j^c$ denote the j th integer passed from maximum filter c to its corresponding vector $s_c$. If we divide the time interval $(j\delta,(j+1)\delta)$ into intervals of length $2^c$ then $m_j^c$ is the maximum of the numbers of cells arriving in each of these intervals. With each value of c we associate a column of processors. Each processor has one register which can store an integer, one input and one output. When the register is empty, the processor waits for an integer to appear at its input and stores it in the register upon arrival. When the register is full, the processor waits for the arrival of a second integer at the input. Upon arrival of the second integer, the processor outputs the maximum of the two successive inputs and clears the register. These processors are similar to the bins referred to above except that they output the maximum of the two inputs instead of the sum. In each column of processors, the output of one processor is fed into the input of the next processor in the column. Thus, if successive values of $m_j^c$ are passed to the first processor in the column c of processors, then, at any time, the k th processor in column c contains the maximum of the most recent $2_k$ values of $m_j^c$ passed to the column of processors. We can think of arranging these processors in a rectangular array with the processors in each column arranged vertically from top to bottom as in FIG. 21. We denote the k th processor in column c by $P_{kc}$. Also, we refer to the collection of the k th processors from all the columns (i.e. $P_{k1},P_{k2},\ldots,P_{km}$) as the k th row of processors. At any time t, the k th row of processors contains the values of $m_{t-2^k\delta,t}^\alpha$ for $\alpha=1,2,4,\ldots$. Periodically, each row of processors is polled and the values of $m_{t-2^k\delta,t}^\alpha$ are used to calculate $M_{t-2^k\delta,t}'(\mu)$ for various values of $\mu$. These values are in turn fed into row of processors which output the sum of two successive inputs so that the i th processor in the k th row of this summing array always contains the sum of the $2^i$ most recent values of $M_{t-2^k\delta,t}'(\mu)$. These provide the value of the sum in the expression for $E_k(t,\mu)$ above if we take i=J−k. In this manner we can, in real-time, efficiently keep track of all the quantities necessary to make a long-term effective bandwidth projection.

Call Admission Control: The estimation of effective bandwidth can be used in two ways. In the first way, we have a number of existing sources sending packets into a network. We can estimate the effective bandwidth of the traffic from all of those sources at some point in the network. If another source requests to begin sending additional traffic through the same point in the network the network will reject the request if the sum of the effective bandwidth calculated and a peak bandwidth proposed in the request exceeds the capacity of that section of the network. Alternatively, the network could decrease the effective bandwidth of the existing traffic by allocating more buffer space.

The second application is slightly different. Suppose that a given traffic stream (for example a video-on-demand service) is fed from one location on the network to a multiplicity of other locations on the network. If another location on the network which is not receiving the transmission requests reception of the transmission, a connection will have to be set up from the location providing the service to the location requesting it In this call setup, the server can specify the equivalent bandwidth to nodes on the network which must carry the traffic from the server to the new recipient. Even if these nodes do not use a protocol which involves the effective bandwidth, the effective bandwidth could simply be sent to them in place of the peak bandwidth and those nodes will set up the connection as if this was the actual peak bandwidth. Alternatively, the server could send both a buffer requirement and a corresponding equivalent bandwidth requirement and the other nodes could react accordingly by making use of a protocol which employs information about effective bandwidth.

What is claimed is:

1. A method for deriving information related to characteristics of transmissions in a packet network comprising:

providing a packet network for carrying a plurality of transmissions from at least one source in which the transmissions from the or each source are divided into a plurality of sequential packets each packet having address data defining an intended address, information data defining information to be transmitted and id data defining a source identity;

the network defining a train of sequential packet transport locations into which packets are loaded for transmission, such that some packet transport locations in a train contain packets and some packet transport locations are empty and such that, when there is more than one different source, the train contains packets from the different sources in a sequential arrangement as determined by the network;

monitoring a train of packet transport locations to determine which packet transport locations are empty and which contain a packet;

generating a series of data elements each corresponding to a respective one of the packet transport locations and each identifying whether the respective packet transport location is empty or whether the respective packet transport location contains a packet;

and carrying out simultaneously at a plurality of different time scales statistical analyses on the series of data elements to determine the characteristics of the transmissions.

2. The method according to claim 1 wherein the statistical analyses are carried out in real time.

3. The method according to claim 1 wherein the data elements are stored and the statistical analyses are carried out subsequent to completion of the transmissions.

4. The method according to claim 1 wherein the statistical analyses are carried out by providing for each different time scale a respective one of a plurality of registers and entering information from the data elements into each register sequentially.

5. The method according to claim 4 wherein the data elements comprise data bits defining "0" when the respective packet transport location is empty and "1" when the respective packet transport location contains a packet and wherein the Information for each register is obtained by adding the bits from a next adjacent previous register.

6. The method according to claim 5 wherein the analyses include for each register calculating the sample variance of a set of successive observations of the register contents and from the variances estimating a value of the Hurst parameter H, which is the slope of a line which approximates the behavior of a plot of the logarithm of the variances of the registers versus the values of the sequential indices of the registers.

7. The method according to claim 1 wherein the packets in the train are provided by a plurality of different sources and wherein the data elements are arranged to identify a packet transport location as containing a packet only when the packet is identified from the id data as provided by a selected one of the sources such that the characteristics determined relate to only the transmissions from the selected source.

8. The method according to claim 1 wherein the packets in the train are provided by a plurality of different sources and wherein the data elements are arranged:

to identify a packet transport location as empty when no packet from any of the sources is contained:

to identify when a packet transport location contains a packet from the id data as provided by each one of the sources which source provided the packet.

9. The method according to claim 1 wherein the characteristics determined from the data elements are used to provide a calculation of an effective bandwidth of the transmissions.

10. The method according to claim 1 for determining whether a source additional to a plurality of existing sources of packet transmissions, each source having a predetermined peak rate of packet transmission, can be connected to a packet network, a transmission medium of the network having a predetermined maximum allowable peak rate of transmissions, including the steps of:

carrying out in real time the statistical analyses on the series of data elements to determine an effective bandwidth of the transmissions from the existing sources;

and calculating whether the additional source can be connected by comparing the effective bandwidth, the predetermined peak rate of packet transmission of the additional source and the predetermined maximum allowable peak rate of transmissions of the transmission medium of the network.

11. The method according to claim 1 for determining whether a source additional to a plurality of existing sources of packet transmissions, each source having a predetermined peak rate of packet transmission, can be connected to a second packet network, a transmission medium of the second packet network having a predetermined maximum allowable peak rate of transmissions, including the steps of:

connecting the additional source to the packet network;

generating said series of data elements from transmissions from said additional source to said packet network;

carrying out in real time the statistical analyses on the series of data elements to determine an effective bandwidth of the transmissions from said additional source;

and calculating whether the additional source can be connected to the second packet network by using the effective bandwidth of the transmissions from said additional source.

12. A method for deriving information related to the characteristics of transmissions in a packet network comprising:

providing a packet network for carrying a plurality of transmissions from at least one source in which the transmissions from the or each source are divided into a plurality of sequential packets each packet having address data defining an intended address, information data defining information to be transmitted and id data defining a source identity;

the network defining a train of sequential packet transport locations into which packets are loaded for transmission, such that some packet transport locations in a train contain packets and some packet transport locations are empty and such that, when there is more than one different source, the train contains packets from the different sources in a sequential arrangement as determined by the network;

monitoring a train of packet transport locations to determine which packet transport locations are empty and which contain a packet;

generating information defining which packet transport locations contain a packet and the empty locations therebetween;

and carrying out simultaneously and in real time a series of statistical analyses on the information at a plurality of different time scales to determine the characteristics of the transmissions.

13. The method according to claim 12 wherein the information comprises a series of data elements each corresponding to a respective one of the packet transport locations and each identifying whether the respective packet transport location is empty or whether the respective packet transport location contains a packet and wherein the statistical analyses are carried out by providing for each different time scale a respective one of a plurality of registers and entering information from the data elements into each register sequentially.

14. The method according to claim 13 wherein the data elements comprise bits which define "0" when the respective packet transport location is empty and "1" when the respective packet transport location contains a packet and wherein the information for each register is obtained by adding the bits from a next adjacent previous register.

15. The method according to claim 14 wherein the analysis includes for each register calculating the sample variance of a set of successive observations of the register contents and from the variances estimating a value of the Hurst parameter H, which is the slope of a line which approximates the behavior of a plot of the logarithm of the variances of the registers versus the values of the sequential indices of the registers.

16. The method according to claim 12 wherein the packets in the train are provided by a plurality of different sources and wherein the information is arranged to identify a packet transport location as containing a packet only when the packet is identified from the id data as provided by a selected one of the sources such that the characteristics determined relate to only the transmissions from the selected source.

17. The method according to claim 12 wherein the packets in the train are provided by a plurality of different sources and wherein the information is arranged:

to identify a packet transport location as empty when no packet from any of the sources is contained;

to identify when a packet transport location contains a packet from the id data as provided by each one of the sources which source provided the packet.

18. The method according to claim 12 wherein the characteristics determined from the information are used to provide a calculation of an effective bandwidth of the transmissions.

19. The method according to claim 12 for determining whether a source additional to a plurality of existing sources of packet transmissions, each source having a predetermined peak rate of packet transmission, can be connected to a packet network, a transmission medium of the network having a predetermined maximum allowable peak rate of transmissions, including the steps of:

carrying out in real time the statistical analysis on the information to determine an effective bandwidth of the transmissions from the existing sources; and and calculating whether the additional source can be connected by comparing the effective bandwidth, the predetermined peak rate of packet transmission of the additional source and the predetermined maximum allowable peak rate of transmissions of the transmission medium of the network.

20. The method according to claim 12 for determining whether a source additional to a plurality of existing sources of packet transmissions, each source having a predetermined peak rate of packet transmission, can be connected to a second packet network, a transmission medium of the second packet network having a predetermined maximum allowable peak rate of transmissions, including the steps of;

connecting the additional source to the packet network;

generating said information from transmissions from said additional source to said packet network;

carrying out in real time the statistical analysis on the information to determine an effective bandwidth of the transmissions from said additional source;

and calculating whether the additional source can be connected to the second packet network by using the effective bandwidth of the transmissions from said additional source.

21. A method of generating packet transmissions for simulating a source having required transmission characteristics for transmitting on a packet network comprising:

providing a packet network for carrying a plurality of transmissions from at least one source in which the transmissions from the or each source are divided into a plurality of sequential packets each packet having address data defining an intended address, information data defining information to be transmitted and id data defining a source identity;

the network defining trains of sequential packet transport locations into which packets are loaded for transmission, such that some packet transport locations in a train contain packets and some packet transport locations are empty and such that, when there is more than one different source, the train contains packets from the different sources in a sequential arrangement as determined by the network;

from a statistical analysis of previous actual transmissions on the network, generating for the simulated source the required characteristic;

generating from the required characteristic a series of data elements each corresponding to a respective one of the packet transport locations and each specifying whether, in a simulated train of packets, a respective packet transport location is empty or whether the respective packet transport location contains a packet;

and creating from the data elements the simulated packet train.

* * * * *